Nov. 27, 1956  E. W. NICHOLS  2,772,407
SIGNAL ATTACHMENT
Filed May 10, 1954

Earl W. Nichols
INVENTOR.

BY James F. Weiler

ATTORNEY

United States Patent Office 2,772,407
Patented Nov. 27, 1956

2,772,407

SIGNAL ATTACHMENT

Earl W. Nichols, Lockhart, Tex.

Application May 10, 1954, Serial No. 428,482

6 Claims. (Cl. 340—213)

The present invention relates to a signal and more particularly relates to an attachment which may be secured to a conventional flashlight so that a visible signal is given at night, for example, when used by fishermen when fishing at night for giving a signal when a fish "bites" at the bait carried by the end of the fishing line.

The present invention may be used for a variety of signaling purposes, such as used by persons, police officers, and the like in directing traffic, especially in and around accidents, or road blocks, tail lights on various vehicles when being towed at night, signaling lights on vehicles such as automobiles, trucks, boats and the like, where the use of colored lens, such as red or amber is desired. The present invention is particularly useful where it is desired to utilize a colored lens for any purpose which may readily be removed so that a clear lens is there and ready for use. The signaling device is particularly advantageous in connection with fishing and, for the purpose of disclosure, the description is directed toward that use.

It is an object of the present invention to provide a signaling device which may readily and easily be attached to a conventional flashlight in order to provide signals for a variety of purposes.

It is yet a further object of the present invention to provide a signaling attachment for flashlights which has a switch operatively associated therewith so that a slight pull on the switch mechanism gives a visual signal thereof.

It is yet a further object of the present invention to provide such a signaling attachment which may readily and easily be mounted and detached from a conventional flashlight, which is inexpensively manufactured, and which is reliable and efficient in use.

Figure 1:
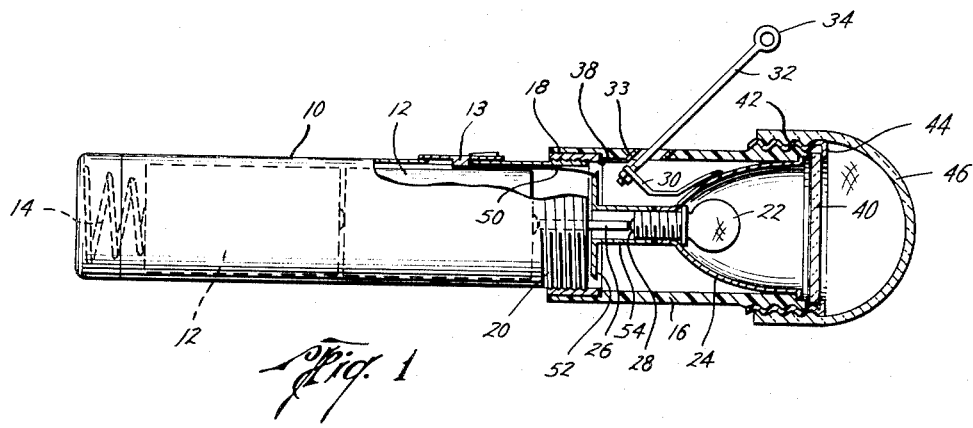
Figure 2:
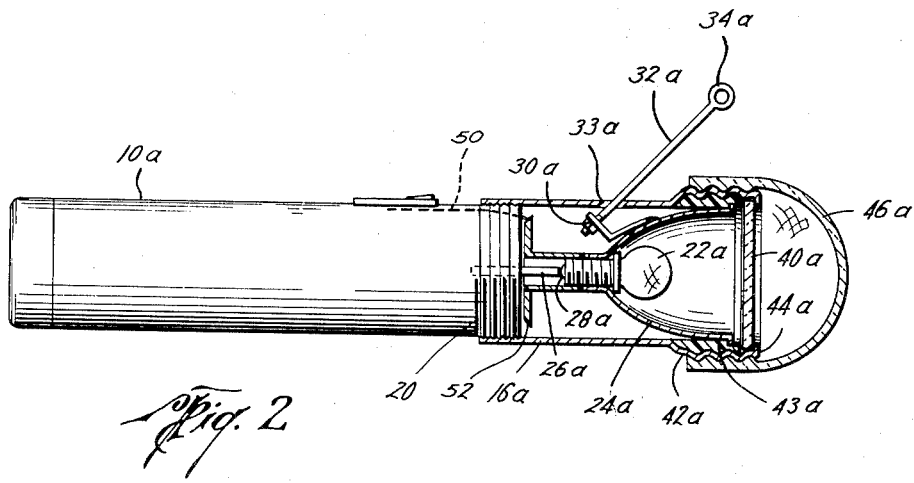

Other and further objects and features of the invention will be apparent from the following description of examples of the invention, given for the purpose of disclosure, and taken in conjunction with the accompanying drawing, where like character references designate like parts throughout the several views and where Figure 1 is a side elevation, partly in section, illustrating a signaling attachment constructed according to the invention connected to a conventional flashlight and Figure 2 is a view similar to that of Figure 1 but illustrates a modification in accordance with the invention.

Referring now to the drawings, and particularly to Figure 1, a conventional battery is illustrated including a casing 10, which may be formed of any material, such as plastic, metals and the like, which houses one or more flashlight or dry cell batteries 12 which are disposed in end to end relation and are yieldingly urged into contact with a conventional flashlight lamp or bulb, not shown, by the coil spring 14. The usual flashlight switching arrangement is generally indicated by the reference numeral 13, but other details of the flashlight are not shown as it is deemed unnecessary to describe in detail the elements of a conventional flashlight, which are well known and have been in use for a great many years. It should be noted, however, that the operation of the attachment does not interfere in any way with the switching arrangement of the flashlight. Accordingly, no more description of the flashlight, as such, is deemed necessary.

Referring now to the attachment which forms the present invention, a cylindrical housing 16 is provided, here shown as a plastic material, which has the inner ring member 18 at its free extremity which is threaded so that the attachment may be threaded to the threaded area 20 of the flashlight body or casing 10. The ring 18 is of an electrical conducting material, such as any of the metals, so that the circuit may be closed to the rearward end of the batteries 12 thereby closing the circuit to the light bulb or lamp 22 disposed in the housing 16, as will be apparent later.

The light or lamp bulb 22 may be of the conventional flashlight bulb type and is threaded by its base or otherwise secured in usual manner in the reflector 24 which is formed of an electrical conducting material, such as metal and the like and which has a reflecting surface on its inner surface in the usual manner thus forming an electrical contact between the base of bulb 22 and the reflector 24.

An extension pin 26 is provided which engages the central electrical contact 28 at the exposed rear end of the bulb 22 and the central electrical contact at the forward end of the battery 12 so that electrical energy is supplied from the batteries 12, which are arranged in series, through the extension 26 and the electrical contact 28 of the bulb 22.

In order that the circuit of the bulb 22 may be completed and the bulb thereby energized, a spring arm member 30 is secured, such as by welding or soldering, although it may be secured in other ways, to the outer surface of the reflector 24 and an arm 32 is bolted or otherwise secured to the spring arm 30, the arm 32 having the eye 34 at its free extremity through which a troutline, fishing line and the like may extend, and which extends through the opening 33 in the casing of the attachment.

The opening or eye 33 is formed of electrical conducting material and, in effect, forms an electric contact which is connected by the conductor 38 to the conductor ring 18. Thus, the circuit from the bulb is completed through the arm 30, arm 32, contact 33, conductor 38, ring 18 to the rearward portion of the batteries 12 when the arm 32 contacts the contact 33, all these elements being formed of material which conducts electricity, such as the various metals and the like. Thus, when the parts are in the position illustrated in Figure 1 the circuit of the flashlight bulb 22 is not closed and, accordingly, the lamp bulb 22 is not energized. When a slight tug or pull is exerted on the arm 32 in any direction, arm 32 engages the electrical contact 33 and the circuit from the forward end to the rearward end of the batteries 12 through the lamp bulb 22 is completed, thereby energizing or lighting the lamp bulb 22. Obviously, a loop formed of electric conducting material or other contact means may be substituted for the eye 33 which is contacted by the arm 32.

A lens 40 formed of glass or other suitable material is provided at the head of the attachment housing 16 and a sleeve 42 being threaded on each side is threaded to the head and has the overturned annular flange 44 to retain the lens 40 in position. If desired, an additional lens 46 may be threaded over the sleeve 42, which lens may be of the colored type, such as red or amber, to give a particularly desired signal. While a rolled thread is shown on sleeve 42, for ease of manufacture, any desired type of thread or securing means may be used.

In operation, the head of the flashlight, not shown, is removed and the attachment is threaded to the housing 10 by means of the ring 18. If desired, a fishing or troutline may be threaded through the eye 34 of the arm 32 and any movement of the line will cause a pull on the arm 32 which causes it to engage the electrical contact 33. This completes the circuit from the head of the battery 12, through the extension 26, bulb 22 through the elements 30, 32, 33, conductor 38, ring conductor 18 to the case 10 and back to the rearward portion of the batteries 12. The switch 13 will be in retracted position to disengage the switch arm 50 from the disk contact 52, as will be apparent later.

In the event the body 10 of the flashlight is formed of a plastic material, instead of a conductor of electricity such as metal and the like, a conducting arm is conventionally provided which extends from the head to the rear of the case and contacts the coil spring 14 so that the circuit through the battery and lamp may be closed. No detailed description of such an arrangement is deemed necessary, however, in view of the conventionality of this arrangement in the manufacture and sale of flashlights having plastic cases and the like.

In order that the flashlight may be operated in the usual manner, a circumferential flange 52 formed of material which conducts electricity is disposed about the bulb socket projection 54 which similarly is formed of electric conducting material and which threadedly engages the base of the bulb 22. Thus, when the switch arm 50 is moved forwardly, as illustrated in Figure 1, the circuit is closed from the front end of the batteries 12 through elements 26, 28, base of the bulb 22, and elements 54, 50 and case 10 to the rearward portion of the batteries 12.

It is noted that the switch arm 50 normally engages the reflector of a conventional flashlight to close the circuit, and the disk 52 and projection 54 permit the use of the switch 13 to operate the flashlight in normal manner although the attachment is in place as illustrated. Ordinarily the pin 26 is spaced from but held centered by the projection 54 in commercial models, such as by nonconducting plastics and the like; however, this detail has been omitted for clarity of the description.

Referring now to Figure 2, a modification is illustrated in that the housing 16a of the attachment is formed of metal which is a conductor of electricity and accordingly, it is unnecessary to include the separate contact 33 and conductor 38 of the embodiment illustrated in Figure 1, the eye contact being indicated by the reference numeral 33a. Here, the same or corresponding parts of the flashlight and attachment are designated by the same numerals with the letter "a" added. It is noted here, however, that the head of the casing 16a is threaded on each side to provide the threaded sleeve 42a and a sleeve member 43a of nonconducting material is provided to act as a support for the outer end of the reflector 24a. The additional lens 46a is then secured directly to the exterior threaded portion of the sleeve 42a. It is noted that threads could be provided on the outer surface of the forward end of the case 16a without the inner threads; however, a rolled thread is illustrated in the drawings which is easy to manufacture and has proved satisfactory. Of course, any satisfactory securing means may be used.

In operation of the example of the invention of Figure 2, the fishing or troutline is placed through the eye 34a of the arm 32a and any pull of the arm 32a causes an engagement of the arm with the sides of the opening 33a in the housing 16a which sides serve as an electrical contact and which will conduct electricity. Thus, a circuit is completed from the head of the batteries 12 through the arm 26a, the electrical contact 28a on the rear of the lamp bulb 22a, the reflector 24a, spring arm 30a, arm 32a, electrical contact 33a, body 16a back through the case 10 and the coil spring 14 (see Figure 1) to the rearward portion of the batteries 12. The remaining parts, mode of operation and the like are the same as that described in connection with the embodiment of the invention illustrated in Figure 1.

It should be noted that when using the attachment, the lamp bulb 22 may be energized by the regular switch 13 on the flashlight, as explained in connection with Figure 1, as well as by causing electrical contact of the arm 32 with the side contact 33a of the opening in the case 16a. Also, the lens 46 or 46a may be removed, in which event the attachment will function as a conventional flashlight.

It should be noted that in the event a non-metallic reflector such as glass, plastic or the like is used, the spring arm may be connected to the bulb socket projection to complete the circuit from the batteries through the bulb 22.

The signaling attachment may thus be adapted for use with any flashlight and may readily be attached or detached from the flashlight by removing the head of the flashlight and threading the attachment thereto or therefrom.

The present invention, therefore, is well suited to carry out the objects and ends set forth and attain the advantages mentioned as well as others inherent therein. Numerous changes in details and arrangements of parts may be made which are encompassed within the spirit of the invention and the scope of the appended claims.

What is claimed is:

1. A signaling attachment for a flashlight comprising a housing adapted to be secured to the head of the flashlight, a reflector in the housing, a lamp bulb in the reflector, said lamp bulb having a base and an electrical contact in its rear portion, means electrically contacting the electrical contact in the rear portion of the bulb to one pole of a battery in the flashlight when the housing is secured to the flashlight, a spring arm formed of an electrical conductor electrically contacting the base of the bulb and extending from the housing, an electrical contact carried by the housing establishing electrical connection at the head of the flashlight with means in the flashlight electrically connected to another pole of the battery when the attachment is secured to the flashlight, said spring arm normally being spaced from said electrical contact but yieldingly engaging said electrical contact on movement of the arm thereby closing a circuit from the battery through the lamp bulb.

2. A signaling attachment for a flashlight having a casing, one or more batteries in electrical connection mounted in the casing and means in the casing for establishing an electrical circuit from the rear of the battery to the head of the casing, said signaling attachment comprising a housing adapted to be secured to the head of the flashlight, a reflector formed of an electrical conductor in the housing, a lamp bulb in the reflector, said lamp bulb having a base and an electrical contact in its rear portion, a first electrical conductor extending from the head of the battery and engaging the electrical contact at the rear portion of the lamp bulb for electrically connecting the lamp bulb to the head of the battery, a spring arm formed of an electrical conductor secured to the reflector and extending through an opening provided in the housing, and a second electrical contact carried by the housing and normally spaced from the spring arm, said second electrical contact establishing electrical connection with the means in the casing for establishing an electrical circuit from the rear of the battery to the head of the casing whereby movement of the spring arm engages the electrical contact for making the circuit through the battery for energizing the lamp bulb connected to opposite ends of the battery.

3. A signaling attachment for a flashlight comprising a housing adapted to be secured to the head of the flashlight, a reflector of electrical conducting material in the housing, a lamp bulb in the reflector, said lamp bulb having a base and an electrical contact in its rear portion, the bulb having its base in electrical contact with the reflector, means electrically connecting the electrical contact in the rear portion of the bulb with a pole of a battery in the flashlight when the housing is secured to the flashlight, an electrical conducting spring arm electrically contacting the reflector and extending from the housing, an electrical contact carried by the housing establishing electrical connection at the head of the flashlight with means in the flashlight electrically connected to another pole of the battery when the attachment is secured to the flashlight, said spring arm normally being spaced from said electrical contact but yieldingly engaging said electrical contact on movement of the arm thereby closing a circuit from the battery through the lamp bulb.

4. The signaling attachment of claim 1 where the housing is formed of an electrical conductor and the electrical contact is electrically coupled to the housing.

5. The signaling attachment of claim 1 where the housing is formed of electrically nonconducting material and includes an electrical conductor electrically connected to the electrical contact and the head of the casing electrically connected to the means at the rear end of the casing.

6. The signaling attachment of claim 1 including a first lens detachably secured to the head of the attachment and a second generally semihemispherical lens detachably secured the head of the attachment.

References Cited in the file of this patent

UNITED STATES PATENTS

| | | |
|---|---|---|
| 2,070,472 | Criswell | Feb. 9, 1937 |
| 2,225,825 | Desimone | Dec. 24, 1940 |
| 2,349,077 | Comparelli | May 16, 1944 |
| 2,530,050 | Evans | Nov. 14, 1950 |
| 2,619,559 | Schenkel | Nov. 25, 1952 |
| 2,643,371 | Sleeger | June 23, 1953 |